April 18, 1967    R. I. N. WEINGART    3,315,230
CREDIT ACCOUNT VERIFICATION SYSTEM
Filed Dec. 4, 1963    4 Sheets-Sheet 1
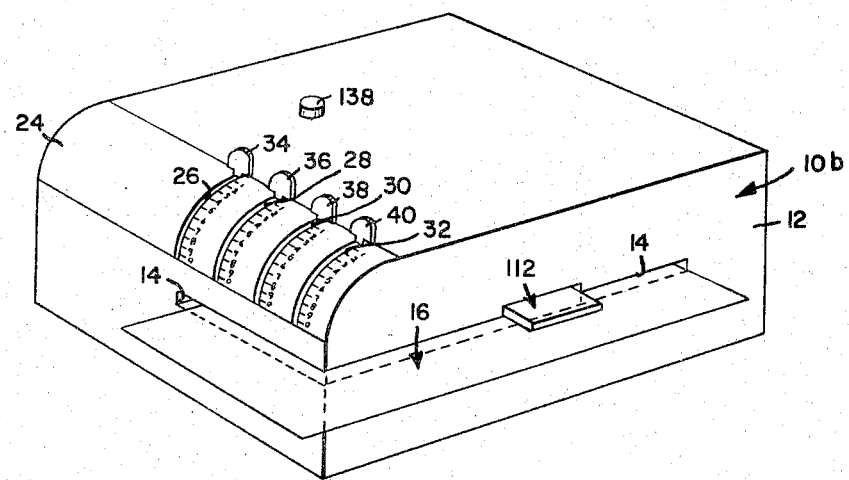
FIG. 1.
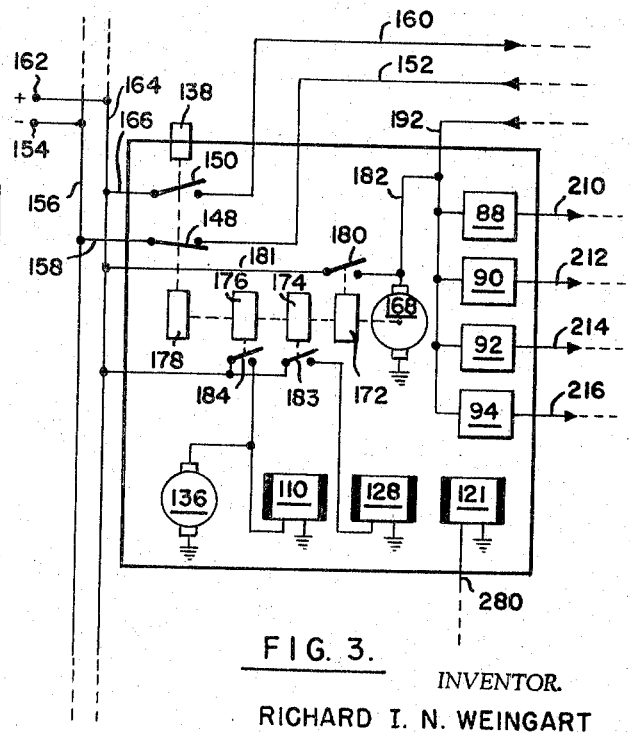
FIG. 2.
FIG. 3.
INVENTOR.
RICHARD I. N. WEINGART
BY
ATTORNEYS

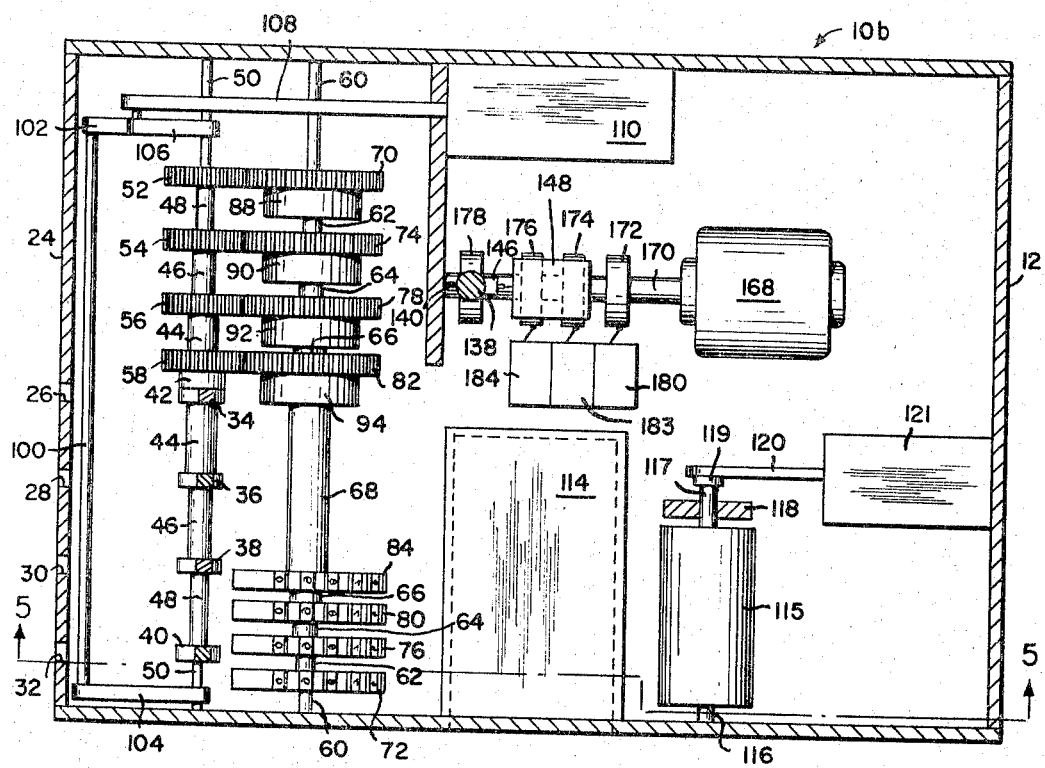

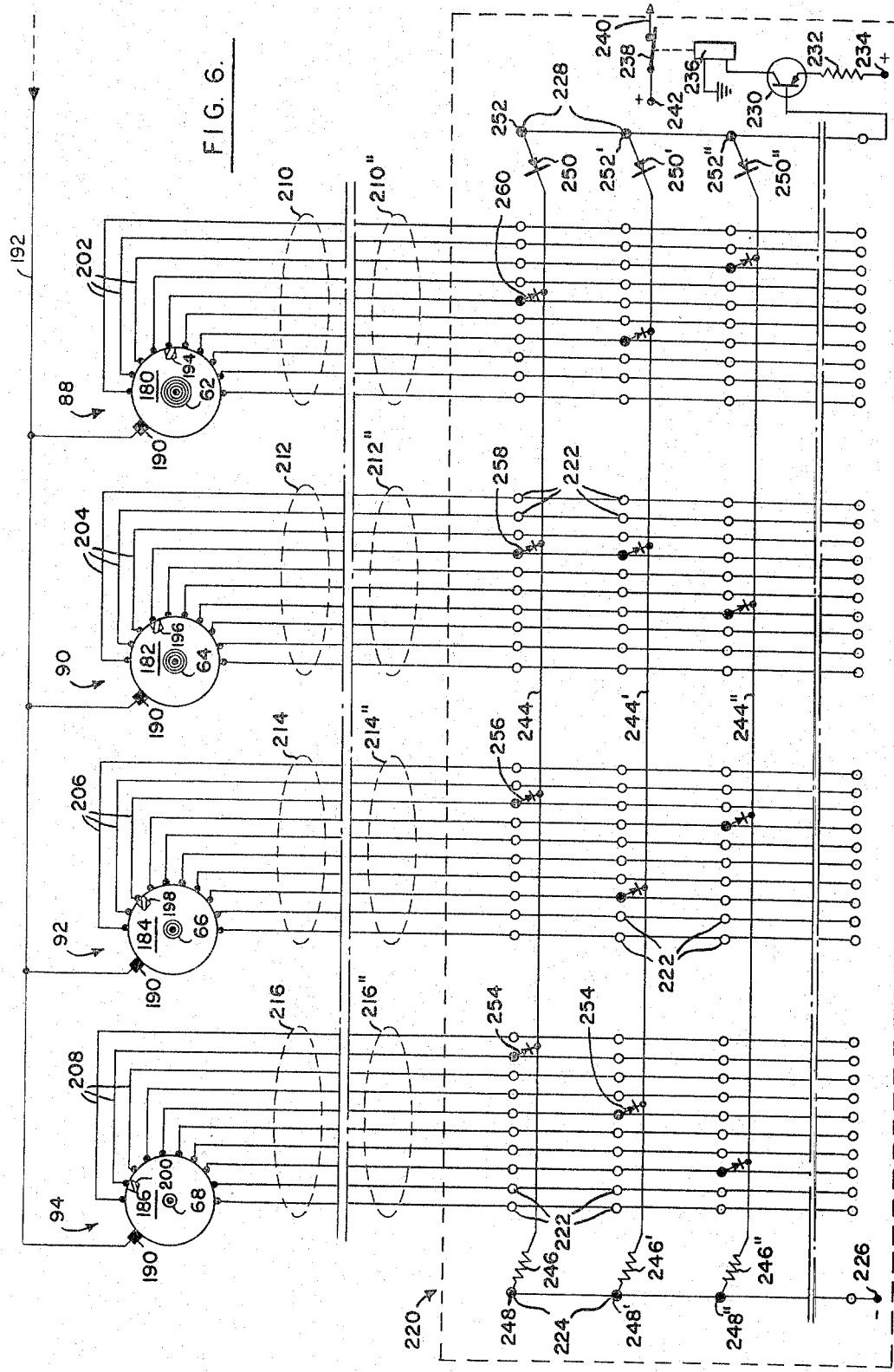

United States Patent Office 3,315,230
Patented Apr. 18, 1967

3,315,230
CREDIT ACCOUNT VERIFICATION SYSTEM
Richard Isaac Newton Weingart, Nassau, Bahamas, assignor to Universal Controls, Inc., Towson, Md., a corporation of Maryland
Filed Dec. 4, 1963, Ser. No. 327,955
6 Claims. (Cl. 340—149)

This invention relates to a system for checking or verifying the status of a credit or charge account. More particularly, the present invention is specifically designed for verifying the status of department store charge accounts although it will be readily apparent that the invention is equally applicable to the verification of any credit transaction such as involved in the purchase of airline or railroad tickets, or the rental of automobiles upon presentation of a credit card.

In the above mentioned types of credit transactions wherein the patron presents a charge-a-plate or a credit card, there is always the problem of determining whether or not the account is in good standing since many accounts become overdrawn or delinquent in payments or are cancelled upon the loss of the charge-a-plate by the rightful owner. Heretofore, such verification generally required the salesperson to telephone the credit department in order to ascertain whether or not the transaction should be completed. However, this method of verification requires a number of personnel to be employed merely for the purpose of checking the accounts and furnishing this information to the individual sales personnel. Obviously this practice is both costly and time consuming since each account must be located and checked from among the hundreds or thousands of other accounts. In addition, the telephone type system is further disadvantageous in that it does not provide any means of insuring the verification of the account. That is, when a salesperson has a number of customers waiting for her attention she may not bother to call the credit department and, in the event that one or more of these accounts are not in good standing, there is no way of later determining whether the account was checked or whether the credit department made an error. Furthermore, this system does not provide any means for ascertaining whether or not the salesperson transmitted the correct account number to the credit department. Thus, if the salesperson inadvertently transposes two digits of the account number as it appears on the presented charge-a-plate, the credit department will check the wrong account and, as a result, a bad account may be indicated as being in good standing or vice versa.

It is therefore a principal object of the present invention to provide a credit verification system which substantially reduces the number of personnel required to verify the credit standing of each account.

It is another object of the present invention to provide a credit verification system which includes means for positively proving whether or not the particular account was verified.

It is yet another object of the present invention to provide a credit verification system which enables the salesperson to double-check the accuracy of the account number which is transmitted for verification.

Still another object of the present invention is to provide a verification system which prints the information from the presented charge-a-plate on the sales slip in addition to performing all of the above indicated functions.

The above objects as well as others relating more particularly to the details of construction and operation will become more fully apparent from the following description when taken with the accompanying drawings in which:

FIGURE 1 is a perspective view of a single verification unit one of which is located at each point of sale;

FIGURE 2 is an illustration of a typical sales slip as it appears upon completion of the sales transaction;

FIGURE 3 is a schematic diagram of the electrical components contained within an individual verification unit;

FIGURE 4 is a top view, partly in section, showing the mechanical components of an individual verification unit;

FIGURE 5 is a sectional view of an individual verification unit taken along the plane indicated by line 5—5 of FIGURE 4;

FIGURE 6 is a schematic diagram of the circuitry forming a portion of the verification system.

Figure 7:
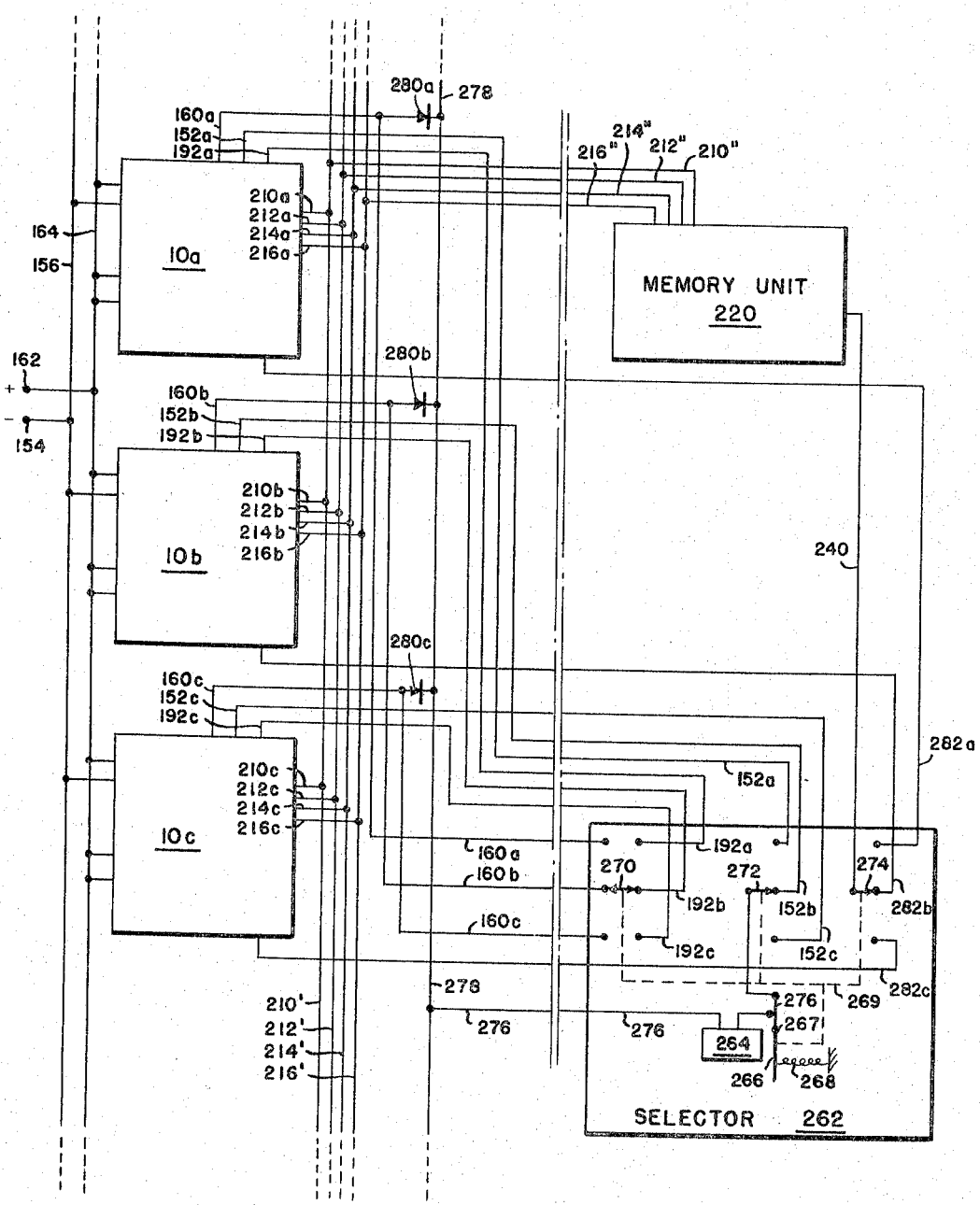
FIGURE 7 is a schematic diagram of the complete verification system including a plurality of individual verification units.

Since each of the individual verification units is identical, only one such unit 10b will be described in detail with particular reference to FIGURES 1, 4 and 5; additional units 10a and 10c being schematically illustrated in FIGURE 7.

Unit 10b includes an outer casing 12 having a slot 14 extending along the front and one side whereby a sales slip 16 may be at least partially inserted into the unit. Within casing 12, slot 14 is bounded by an upper plate 18 and a lower plate 20 between which there is positioned an abutment member 22 which limits the extent to which the sales slip may be inserted into the verification unit.

The upper front portion of casing 12 is rounded at 24 and is provided with a plurality of arcuate slots 26, 28, 30 and 32 through which there extend the upper ends of a plurality of levers 34, 36, 38 and 40. It will also be noted that a set of reference numerals 1 through 10 is provided adjacent each slot and these numerals refer to the ten positions in which each lever may be set by the salesperson.

As most clearly shown in FIGURE 4, the internal ends of levers 34, 36, 38 and 40 are respectively secured to the ends of individual, concentric sleeves 42, 44, 46 and 48 so that each individual sleeve may be selectively rotated about stationary shaft 50 to a position corresponding to the setting of its associated lever. The opposite end of sleeve 48 carries a drive gear 52 and, similarly, the opposite ends of sleeves 46, 44 and 42 carry respective drive gears 54, 56 and 58.

A second stationary shaft 60 is mounted parallel to shaft 50 and a plurality of concentric sleevss 62, 64, 66 and 68 are journalled thereon. One end of innermost sleeves 62 is rigidly secured to a gear 70 driven by gear 52 and the other end of sleeve 62 is rigidly connected to a printing wheel 72. Similarly, one end of each of sleeves 64, 66 and 68 is respectively connected to driven gears 74, 78 and 82 while the opposite ends of these sleeves are connected to printing wheels 76, 80 and 84. Each of printing wheels 72, 76, 80 and 84 carries a set of ten raised numerals which correspond to the ten positions in which each of the levers may be set, it being understood that there is a 1:2 ratio between drive gears 52, 54, 56, 58 and driven gears 70, 74, 78, 80.

In addition to interconnecting gears 70, 74, 78 and 82 with respective printing wheels 72, 76, 80 and 84, it will also be noted that each of sleeves 62, 64, 66 and 68 passes through one of a plurality of rotary switches 88, 90, 92 and 94. Although the electrical function of these switches will be deferred until the description of FIGURE 6, it is to be understood that each of switches 88, 90, 92 and 94 includes a ten position rotor the settings of which are determined by the angular positions of sleeves 62, 64, 66 and 68, respectively.

In order to maintain the levers in their selected positions, each lever carries a detent 96 which is adapted to engage a plurality of indentations 98 provided on the interior surface of arcuate casing portion 24. Thus, it will be apparent that when the salesperson sets the levers so as to correspond to the account number to be verified, the printing wheels are thereby set to print this account number on the inserted sales slip and the rotary switches are simultaneously set for a purpose hereinafter to be described.

In order to return the levers to their initial position after the transaction is completed, a wiper bar 100 extends across the levers and is mounted at opposite ends by arms 102 and 104 journalled for rotation about shaft 50. Arm 102 is rigidly connected to a second arm 106 the latter of which is pivoted to the armature 108 of a solenoid 110. Thus, upon completion of a given transaction, the energization of solenoid 110 pivots bar 100 about shaft 50 so as to engage and return each of the levers to their initial position, whereupon, deenergization of solenoid 110 returns bar 100 to the position illustrated in FIGURE 5.

In addition to receiving the sales slip 16, each of the verification units is adapted to receive the patron's charge-a-plate generally indicated 112. As shown in FIGURE 5, the charge-a-plate is inserted face down so that its edges are received in the space formed between upper plate 18 and a backing plate 114.

In order to positively prove whether or not each sales transaction has been verified and to indicate the result of the verification, each verification unit includes a printing roller 115 having a first shaft 116 journalled in casing 12 and a second shaft 117 journalled in a bracket 118. One end of a lever 119 is secured to shaft 117 and the other end of the lever is pivotally connected to the armature 120 of a solenoid 121. Roller 116 carries two lines of type 122 and 124 and it is to be understood that type 122 comprises the word "DISAPPROVED," whereas type 124 comprises the word "APPROVED." It will also be noted that type 122 is in the illustrated position for printing when solenoid 121 is deenergized, whereas upon energization of solenoid 121, the roller is rotated so that type 124 is moved into the printing position.

The remainder of the printing mechanism includes a platen 126 which is adapted to be projected upwardly to simultaneously strike the printing wheels and the type on both charge-a-plate 112 and roller 115 upon the energization of a solenoid 128 positioned in the lower portion of the unit. Also provided in the lower portion of the unit are a pair of reels 130 and 132 carrying an ink ribbon 134 which is periodically advanced across the upper surface of the platen upon the intermittent energization of a motor 136 driving take-up reel 132.

In order to control the sequence of operation of the various motors and solenoids just described, each verification unit includes an individual control system which will now be described with particular reference to FIGURES 3, 4 and 5. This control system includes a pushbutton 138 which is normally maintained in its uppermost position as illustrated in FIGURE 5 by means of a detent 140 engaging an indentation 142. Conversely, upon manual depression of the pushbutton, it is adapted to be maintained in its lower position by the engagement of detent 140 with indentation 144.

Pushbutton 138 is formed with a cam portion 146 which is adapted to actuate the movable contacts of a pair of switches 148 and 150. At this point, it is to be noted that switch 148 is normally closed and switch 150 is normally open so that, upon depression of pushbutton 138, switch 148 opens and switch 150 is closed. Thus, as shown in FIGURE 3, switch 148 normally connects a line 152 to a negative power source 154 through a main power line 156 and a branch line 158. On the other hand, switch 150 is adapted upon closure to connect a line 160 with a positive power source 162 through a main power line 164 and branch line 166.

The control circuit in each verification unit also includes a grounded motor 168 having an output shaft 170 driving a plurality of cams 172, 174, 176 and 178. Cam 172 actuates a normally open switch 180 which, as shown in FIGURE 3, is positioned in a line 181 interconnecting the motor with main power line 164. It will also be noted that motor 168 is connected through a branch line 182 to a second power line 192 so that the motor is adapted to be energized through either of lines 181 or 182 as will be subsequently described in detail.

Cam 174 actuates a switch 183 which is positioned in series between positive power line 164 and solenoid 128 the latter of which operates platen 126. Similarly, cam 176 actuates a switch 184 which is connected in series between the positive power line 164 and motor 136 which drives the ink ribbon as well as solenoid 110 which returns the levers to their initial positions. Lastly, cam 178 is adapted to engage the bottom of pushbutton 138 so as to return the depressed button to its initial, uppermost position at the end of each operating cycle.

Reference is now made to the previously mentioned rotary switches 88, 90, 92 and 94. As shown in FIGURE 6, these switches include conductive rotors 180, 182, 184 and 186 which are respectively connected to concentric sleeves 62, 64, 66 and 68. A positive potential is applied to each of the rotors from a power line 192 and it will be noted that each of rotors 180, 182, 184 and 186 is provided with an insulated portion 194, 196, 198 and 200, respectively. Lastly, each switch is provided with a set of ten output terminals which are individually connected to output lines 202, 204, 206 and 208; these lines being grouped to form respective cables 210, 212, 214 and 216.

From the foregoing description it will be apparent that the selective positioning of levers 40, 38, 36 and 34 so as to correspond to the digits of an account number to be verified results in the positioning of insulated segments 194, 196, 198 and 200 so as to disconnect one output line of each set from the positive potential source to which line 192 is connected. Thus, the absence of positive potentials on one output line of each switch comprises a set of output signals indicating the digits of the account number which is to be verified and, as shown in FIGURE 7, the output cables of each of verification units 10a, 10b, 10c, etc. are connected in parallel through lines 210', 212', 214' and 216' to a remotely located memory unit 220 having input cables 210", 212", 214" and 216".

The purpose of memory unit 220 is to compare the input signals received from each verification unit with a list of accounts which are not in good standing for any one or more of the reasons indicated hereinabove. Of course, numerous types of such memory systems are known and may be employed in the present system. However, a preferred type of memory unit is illustrated in FIGURE 6 and is of the type shown in the application of Lange and Mackey, Ser. No. 228,933, filed October 8, 1962. This unit comprises a plurality of conductive sockets 222 which are positioned in series in each of the digital input lines comprising input cables 210", 212", 214", and 216". In practice, sockets 222 are preferably provided in a pin board and arranged in horizontal rows of which several hundred may be required in order to accommodate all of the accounts which are not in good standing at any particular time. The pin board is also provided with a series of sockets 224 all of which are connected to a negative power terminal 226 and another series of sockets 228 all of which are connected to the base of a transistor 230. The emitter of this transistor is connected through a resistor 232 to a positive supply terminal 234 while the collector is connected to a grounded relay coil 236. Coil 236 is adapted to open a switch 238 so as to disconnect an output signal line 240 from a positive supply terminal 242 when the relay coil is energized.

The account numbers of those accounts which are not in good standing are represented by horizontally extending conductors 244, 244', 244", etc.; each individual conductor representing a single bad account. One end of each conductor is connected through a resistor 246 to a conductive pin 248 which is adapted to be received in one of sockets 224. The other end of each conductor is connected through a respective diode 250 to a conductive pin 252 which is adapted to be received in one of sockets 228. Intermediate its ends, connector 244 is provided with a plurality of diodes 254, 256, 258 and 260, each of these diodes having an associated plug adapted to be received in one of sockets 222. Similarly, conductors 244' and 244" are connected to diodes having the same numerals primed and double primed. As will be noted from the positions of diodes 254, 256, 258 and 260, conductor 244 represents account number 2345, whereas, conductor 244' represents account number 5847 and conductor 244" represents account number 8473.

The operation of the memory unit is as follows. It will first be assumed that each of levers 34, 36, 38 and 40 is in its initial or "off" position as illustrated in FIGURE 1 in which case none of the insulated inserts 194, 196, 198 or 200 is in engagement with any of the output terminals of the switches. Therefore, assuming that line 192 is connected to a positive potential source, each of sockets 222 will be at a positive potential and current will flow through all of the diodes, lines 244, 244' and 244" to the negative potential established at terminal 226. However, since the value of resistors 246, 246' and 246" is relatively large, the current flow is quite small and lines 244, 244' and 244" wil lbe maintained substantially at the positive potential of line 192. As a result, current will not flow from the base of the transistor 230 through diodes 250, 250' or 250". Thus, the transistor is blocked with no current flowing through the collector whereby coil 236 remains deenergized and switch 238 remains closed.

Now let it be assumed that the levers are set so as to correspond to account number 2345. This results in the movement of the switch rotors to the positions illustrated in FIGURE 6 wherein each of the diodes 254, 256, 258 and 260 is disconnected from the positive potential of line 192 due to the positions of insulated inserts 200, 198, 196 and 194, respectively. As a result, the potential of line 244 becomes negative and current flows from the base of transistor 230, through diode 250, resistor 246 to negative terminal 226. This current flow unblocks the transistor so that current also flows through the collector thereby energizng coil 236 and opening switch 238. Of course, lines 244' and 244" remain at positive potentials since the diodes associated therewith remain connected through their respective rotors to the positive potential of line 192. On the other hand, if the levers are moved to positions representing account number 5847, the potential of connector 244' will become negative with the consequent flow of current in the transistor collector circuit. Similarly, if the levers are set so as to represent account number 8473, connector 244" will become negative with the same resultant flow of current in the transistor collector circuit. Thus, it will be apparent that whenever the levers are set in positions which correspond to the digits of an account which is not in good standing, relay 236 will be energized and switch 238 will be opened thereby providing an output signal through line 240.

Reference is now made to FIGURE 7 which illustrates the complete verification system which comprises a plurality of individual verification units 10a, 10b, 10c, etc., memory unit 220 and a unit selector switch 262. Selector switch 262 comprises a three-bank, rotary stepping switch of conventional construction which includes a solenoid 264 having an armature 266 pivoted at 267 so as to pivot against the biasing force of a spring 268 upon energization of the solenoid. Armature 266 is connected to advance each of movable contacts 270, 272 and 274 by means of a mechanical connection 269; it being understood that this connection comprises a conventional ratchet and pawl mechanism the details of which are well known. In addition, armature 266 carries a circuit breaker switch 276 whereby solenoid 264 is repeatedly energized and deenergized so as to successively advance the movable contacts as will be more fully described hereinafter.

The positive terminal of solenoid 264 is connected through line 276 to a common line 278 which, in turn, is connected through diodes 280a, 280b and 280c to each of lines 160a, 160b and 160c of the respective verification units; it being remembered from the description of FIGURE 3 that lines 160 are adapted to be connected to positive power line 164 upon closure of switch 150.

The negative terminal of solenoid 264 is connected through circuit breaker switch 276 to movable contact 272 which is adapted to successively engage the terminals of the second bank which are connected through lines 152a, 152b and 152c to switches 148 of the respective verification units. Since switches 148 are normally closed it will be apparent that, upon depression of any one pushbutton 138, current will flow through line 160 and diode 280 of that verification unit to common lines 278 and 276 from which it will flow through solenoid 264, switch 276, contact 272 and one of lines 152 and switch 148 to negative terminal 154. Thus, so long as contact 272 continues to engage successive terminals which are connected to verification units having normally closed switches 148, the solenoid will continue to be energized, and deenergized by switch 276, so that the movable contacts will continue their stepped advancement. On the other hand, when contact 272 is advanced into engagement with a terminal of the second bank which is connected to a verification unit wherein switch 148 has been opened, the circuit to negative terminal 154 will be broken so that solenoid 264 will not be energized and the movable switch contacts will not be advanced to the next position, but rather, the movable contacts will remain in engagement with the terminals of that verification unit wherein pushbutton 138 has been depressed.

Reference is now made to the first bank of terminals which are adapted to be bridged by movable contact 270. It will be noted that the left-hand terminals of this bank are connected to lines 160a, 160b and 160c, whereas, the right-hand terminals are respectively connected to lines 192a, 192b and 192c. Thus, contact 270 operates to establish a closed circuit between lines 160 and 192 of each verification unit whereby power may be supplied through line 192 to the rotary switches and control motor of each unit.

Lastly, reference is made to the third bank of terminals associated with movable contact 274 which is connected to output line 240 of memory unit 220. The terminals of this bank are connected through lines 282a, 282b and 282c to the respective solenoids 121 of each verification unit; it being remembered that solenoids 121 actuate printing rollers 115 so that either type 122 or type 124 is rotated into printing position.

The operation of the entire verification system is as follows. Upon presentation of the customer's charge-a-plate or credit card, the salesperson sets each of levers 34, 36, 38 and 40 of verification unit 10a so as to correspond to the digits of the account number as it appears on the charge-a-plate and, for purposes of example, it will be assumed that it is desired to verify the status of account number 2345. The salesperson then inserts the charge-a-plate and a blank sales slip into verification unit 10a and depresses pushbutton 138.

As previously set forth in the description of FIGURES 4 and 6, the setting of levers 34, 36, 38 and 40 results in the simultaneous setting of printing wheels 72, 76, 80 and 84 as well as rotors 180, 182, 184 and 186 of respective switches 88, 90, 92 and 94. Thus, immediately upon depression of pushbutton 138, switch 150 is closed so that line 160a is connected to positive power terminal 162. Closure of this switch energizes common power line 278 through diode 161a so that a positive potential is applied to solenoid 264 of selector switch 262. Of course, common line 278 may have been energized previously due to the prior depression of one or more pushbuttons of other verification units. However, the previous actuation of other units will merely result in a slight time delay during which time the selector switch successively connects each of these verification units to the memory unit and completes the respective transmissions therebetween. It will also be noted that the previous energization of common line 278 will have no effect upon lines 160a, 160b and 160c due to diodes 280a, 280b and 280c which prevent current flow from the former to the latter.

After transmissions to the previously actuated units are completed, contacts 270, 272 and 274 will continue their advancement until contact 272 engages the terminal connected to line 152a. When this occurs, solenoid 264 is deenergized since line 152a has remained disconnected from negative terminal 154 since the opening of switch 148 which occurred upon the initial depression of pushbutton 138. Thus, contacts 270, 272 and 274 remain in engagement with the terminals associated with verification unit 10a and current flows from positive power terminal 162 through power line 164, branch line 166, switch 150, and line 160a to contact 270 from which the current flows through line 192a back to verification unit 10a wherein it flows through line 182 to energize motor 168. Simultaneously, current flows from line 192a to each of rotary switches 88, 90, 92 and 94 and through their respective rotors to memory unit 220 through all of output lines 202, 204, 206 and 208 except those which are disconnected from 192a by insulated inserts 194, 196, 198 and 200. As a result, the absence of current flow through each of the lines to which diodes 254, 256, 258 and 260 are connected results in a potential drop of connector 244 so that transistor 230 becomes unblocked and current flows through its collector circuit thereby energizing coil 236 and opening switch 238. The opening of switch 238 disconnects output line 240 from power terminal 242 so that no current flows through line 240, movable contact 274 and line 280 to solenoid 121. Thus, solenoid 121 is deenergized and printing roller 115 is positioned such that type 122 comprising the word "DISAPPROVED" is in the printing position illustrated in FIGURE 5.

Of course, all of the above described transmissions occur instantaneously upon engagement of movable contacts 270, 272 and 274 with the terminals associated with verification unit 10a. Thus, these transmissions occur simultaneously with the initial energization of control motor 168 and prior to the operation of switches 180, 183 and 184 which are subsequently actuated in the following sequence.

First, cam 174 closes switch 183 so that solenoid 128 is energized and platen 126 is thereby projected upwardly to effect the simultaneous printing of the information contained on the printing wheels, the charge-a-plate, and printing roller 115. Of course, the closure of switch 183 by cam 174 is only momentary so that solenoid 128 is immediately deenergized and platen 126 drops back to its lowermost position.

Immediately thereafter, cam 176 closes switch 184 so that motor 136 is momentarily energized and advances ink ribbon 134. Simultaneously, solenoid 110 is momentarily energized whereby armature 108 is retracted so that wiper bar 109 engages each of the levers and returns them to their initial or "off" position, whereupon, the deenergization of solenoid 110 permits the wiper bar 100 to return to the position illustrated in FIGURE 5.

Simultaneously with the momentary closure of switch 184 by cam 176, cam 172 closes switch 180 so that the positive terminal of control motor 168 is connected through line 181 and main power line 164 to positive terminal 162. This establishes a secondary circuit for maintaining motor 168 energized while cam 178 engages the bottom of pushbutton 138 and returns the button to its uppermost position wherein switch 150 is reopened and switch 148 is returned to its normally closed position. Thus, control motor 168 continues to rotate for a brief period until it reaches the end of its operating cycle at which time cam 172 reopens switch 180 so that the control circuit is restored to the initial condition illustrated in FIGURE 3.

Immediately upon the return of pushbutton 138 to its uppermost position, the closure of switch 148 again establishes a circuit to negative terminal 154 so that current flows through solenoid 264 and contact 272, whereupon, the selector switch advances to its next position. Of course, the advancement of selector 262 depends upon whether or not the pushbutton 138 of another verification unit has been depressed so as to apply a positive potential to common line 278. If such is the case, the selector switch will continue to advance until contact 272 arrives at the terminal associated with that verification unit, whereupon, it will remain at rest and the transmission of signals will occur between that verification unit and the memory unit. On the other hand, if no other verification unit has been energized, the contacts of the selector switch will merely remain stationary until a pushbutton 138 is depressed.

From the foregoing description it will be apparent that when pushbutton 138 is returned to its uppermost position by cam 178, this provides a signal to the salesperson that the verification has been completed so that she may then remove sales slip 16. The sales slip then appears as shown in FIGURE 2 wherein it will be noted that the word "DISSAPPROVED" has been printed within box 284. On the other hand, if the account had been in good standing, there would have been no connector in the memory unit corresponding to connector 244 so that switch 238 would not have been opened and solenoid 121 would have remained energized. This would have placed type 124 rather than 122 in printing position so that the word "APPROVED" would appear in box 284. It will therefore be noted that the operation of the present system results in the printing of positive evidence of the status of the account upon the sales slip in either event. In addition, it will be noted that the sales slip bears the name, address and account number of the patron within box 286, this information having been printed by the patron's charge-a-plate. Furthermore, the sales slip also bears the number of the account which was verified and this appears in box 288 wherein it was printed by printing wheels 72, 76, 80 and 84. Thus, the salesperson may perform a double check in order to determine whether or not she has set the levers properly so as to correspond to the account number which was to be verified. For example, if lever 40 had been moved to position 6 rather than 5, the account number appearing in box 288 would read 2346 and the discrepancy between this number and that printed in box 286 by the charge-a-plate would be readily apparent. It will therefore be noted that the present system not only provides for positively indicating whether or not the account has been verified, but also indicates in positive terms the results of the verification. In addition, the present invention provides information on the sales slips as to precisely which account was verified so that the accuracy of the verification may be easily double checked.

In the foregoing description of operation it was assumed that the customer had his charge-a-plate with him. However, it sometimes happens that a customer having an account in a particular store will not have his charge-a-plate with him at the time he desired to make a purchase. In this instance, it is merely necessary for the salesperson to telephone the credit department in order to ascertain the number of the patron's account and, after receiving this information, the operation of the verification unit may be performed in the same manner as that just described except that it will be necessary for the salesperson to manually write in the name, address and account number in box 286. Thus, the store need only provide a single person in the credit department with a directory of names and account numbers for looking up the account numbers of those patrons who do not have their charge-a-plates with them. It will therefore be apparent that the present invention results in substantially reducing the number of personnel which would otherwise be required in order to manually locate each account and verify its status before each sale.

Having described one embodiment of the present invention, it will be readily apparent that numerous changes and modifications may be made therein without departing from the scope of the invention. For example, it will be obvious that pushbutton keys such as those employed in conventional cash registers may be substituted for levers 34, 36, 38 and 40. In addition, it will be apparent that numerous other types of memory units such as those employing punch cards, magnetic tapes or the like may be employed in place of the illustrated memory unit. Of course, it will also be apparent that ink ribbon 134 may be eliminated if sales slips having micro-incapsulated ink supplies are employed and it is also to be understood that reflective or magnetic ink may be employed whereby the sales slips may be later processed by automatic data processing systems of known construction. It is therefore to be understood that the foregoing description merely relates to one possible embodiment of the invention and that the invention is not to be otherwise limited than as specifically set forth in the following claims.

What is claimed is:

1. A system for verifying the status of an account comprising a verification unit including means for receiving a sales slip, selector means for feeding an account number to be verified into said unit, printing head means connected to said selector means for printing the account number to be verified upon the sales slip, signal producing means connected to said selector means for producing a signal indicative of the account number to be verified, a memory unit containing data as to the status of said account connected to said signal producing means, said memory unit including means for producing an output signal indicative of the status of said account, and second printing head means responsive to the output signal from said memory unit for printing an indication of the status of said account upon the sales slip.

2. The system as claimed in claim 1 including a plurality of said verification units and unit selector means for individually interconnecting each of said verification units with said memory unit.

3. A system for verifying the status of an account comprising a verification unit including means for receiving a sales slip, selector means for feeding an account number to be verified into said unit, printing head means connected to said selector means for printing the account number to be verified upon the sales slip, means for receiving a customer's credit card, said card having type for printing customer identification data upon the sales slip, a memory unit containing data as to the status of said account connected to said signal producing means, said memory unit including means for producing an output signal indicative of the status of said account, and second printing head means responsive to the output signal from said memory unit for printing an indication of the status of said account upon the sales slip.

4. The system as claimed in claim 3 including plurality of said verification units and unit selector means for individually interconnecting each of said verification units with said memory unit.

5. A system for verifying the status of an account comprising a verification unit including means for receiving a sales slip, selector means for feeding an account number to be verified into said unit, printing head means connected to said selector means for printing the account number to be verified upon the sales slip, a plurality of multiple position switches individually actuated by said selector means for producing output signals indicative of the digits of the account number to be verified, a memory unit containing data as to the status of said account connected to said signal producing means, said memory unit including means for producing an output signal indicative of the status of said account, and second printing head means responsive to the output signal from said memory unit for printing an indication of the status of said account upon the sales slip.

6. The system as claimed in claim 5 including a plurality of said verification units and unit selector means for individually interconnecting each of said verification units with said memory unit.

No references cited.

NEIL C. READ, *Primary Examiner.*

H. PITTS, *Assistant Examiner.*